(12) United States Patent
Khawam et al.

(10) Patent No.: US 9,838,441 B2
(45) Date of Patent: *Dec. 5, 2017

(54) HYBRID COMMUNICATIONS SYSTEM USING PEER-TO-PEER AND CENTRALIZED ARCHITECTURE

(71) Applicant: RingCentral, Inc., Belmont, CA (US)

(72) Inventors: Patrice Khawam, San Francisco, CA (US); Xiaoqiang Sun, San Jose, CA (US); Vlad Vendrow, Redwood City, CA (US); Santosh Panattu, San Jose, CA (US); Martin Arastafar, Redwood City, CA (US)

(73) Assignee: RINGCENTRAL, INC., San Mateo, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/090,181

(22) Filed: Apr. 4, 2016

(65) Prior Publication Data

US 2016/0301720 A1    Oct. 13, 2016

Related U.S. Application Data

(63) Continuation of application No. 14/681,309, filed on Apr. 8, 2015, now Pat. No. 9,332,561.

(51) Int. Cl.
*H04W 72/08*    (2009.01)
*H04L 29/06*    (2006.01)
*H04B 17/309*   (2015.01)
*H04L 29/08*    (2006.01)

(Continued)

(52) U.S. Cl.
CPC ....... *H04L 65/1069* (2013.01); *H04B 17/309* (2015.01); *H04L 43/08* (2013.01); *H04L 65/80* (2013.01); *H04L 67/104* (2013.01); *H04L 67/1091* (2013.01); *H04L 67/14* (2013.01);
(Continued)

(58) Field of Classification Search
None
See application file for complete search history.

(56) References Cited

U.S. PATENT DOCUMENTS 8,150,334 B2 *  4/2012  Albertsson ............... H04W 4/10
                                                    455/518
2005/0086358 A1 *  4/2005  Rosenberg ............ H04L 65/403
                                                    709/231

(Continued)

*Primary Examiner* — Mohammad Adhami
(74) *Attorney, Agent, or Firm* — Fenwick & West LLP

(57) ABSTRACT

A hybrid communication system estimates a quality of service (QoS) for a plurality of session channels available to couple a first device on a first network with a second device on a second network. A first session channel is selected, from the plurality of session channels, that has a highest estimated QoS of all the plurality of session channels over a first time interval. The devices are instructed to establish a hybrid media session using the first session channel. During the hybrid media session the estimated QoS for the plurality of session channels is monitored. Responsive to the monitoring, a second session channel is selected, from the plurality of session channels, that has a highest estimated QoS of all the plurality of session channels over a second time interval. Responsive to the selecting, the devices are instructed establish the hybrid media session using the second session channel.

17 Claims, 6 Drawing Sheets

(51) Int. Cl.
*H04L 12/26* (2006.01)
*H04W 76/02* (2009.01)
(52) U.S. Cl.
CPC ........ *H04W 72/085* (2013.01); *H04W 76/022* (2013.01)

(56) References Cited

U.S. PATENT DOCUMENTS

| | | | | |
|---|---|---|---|---|
| 2013/0246642 A1* | 9/2013 | Chen | ....................... | H04L 67/14 709/228 |
| 2014/0241215 A1* | 8/2014 | Massover | ........... | H04L 12/1818 370/260 |
| 2014/0380137 A1* | 12/2014 | Zhang | ............... | G06F 17/30905 715/202 |

* cited by examiner a
HYBRID COMMUNICATIONS SYSTEM USING PEER-TO-PEER AND CENTRALIZED ARCHITECTURE

CROSS REFERENCE TO RELATED APPLICATIONS

This application is a continuation of U.S. application Ser. No. 14/681,309, filed Apr. 8, 2015, which is hereby incorporated by reference in its entirety.

BACKGROUND

This disclosure generally relates to electronic audio and/or video communications between multiple parties in enterprise networks and, more particularly, to a hybrid communication system that uses a peer-to-peer and centralized architecture for such communications.

The types of devices and services that users employ to effect electronic communications with one another have expanded significantly in recent years. For example, whereas users once used phones solely to engage in audio communications with one another, devices (e.g., smart phones) now enable people to engage in a wide variety of different types of electronic communications with one another, including video conferencing, text messaging, email, instant messaging, and location sharing.

Typically a centralized server mediates communications between two devices on an enterprise network in a media session, and users do not have an option of switching an established media session to some peer-to-peer connection of potentially higher bandwidth. Similarly, two electronic devices conducting a media session over a peer-to-peer connection do not have an option of switching the established media session over to some other peer-to-peer connection and/or centralized server connection that has better bandwidth. Aspects of the disclosed embodiments address these and other concerns regarding communications between electronic devices in enterprise systems.

Figure 1:
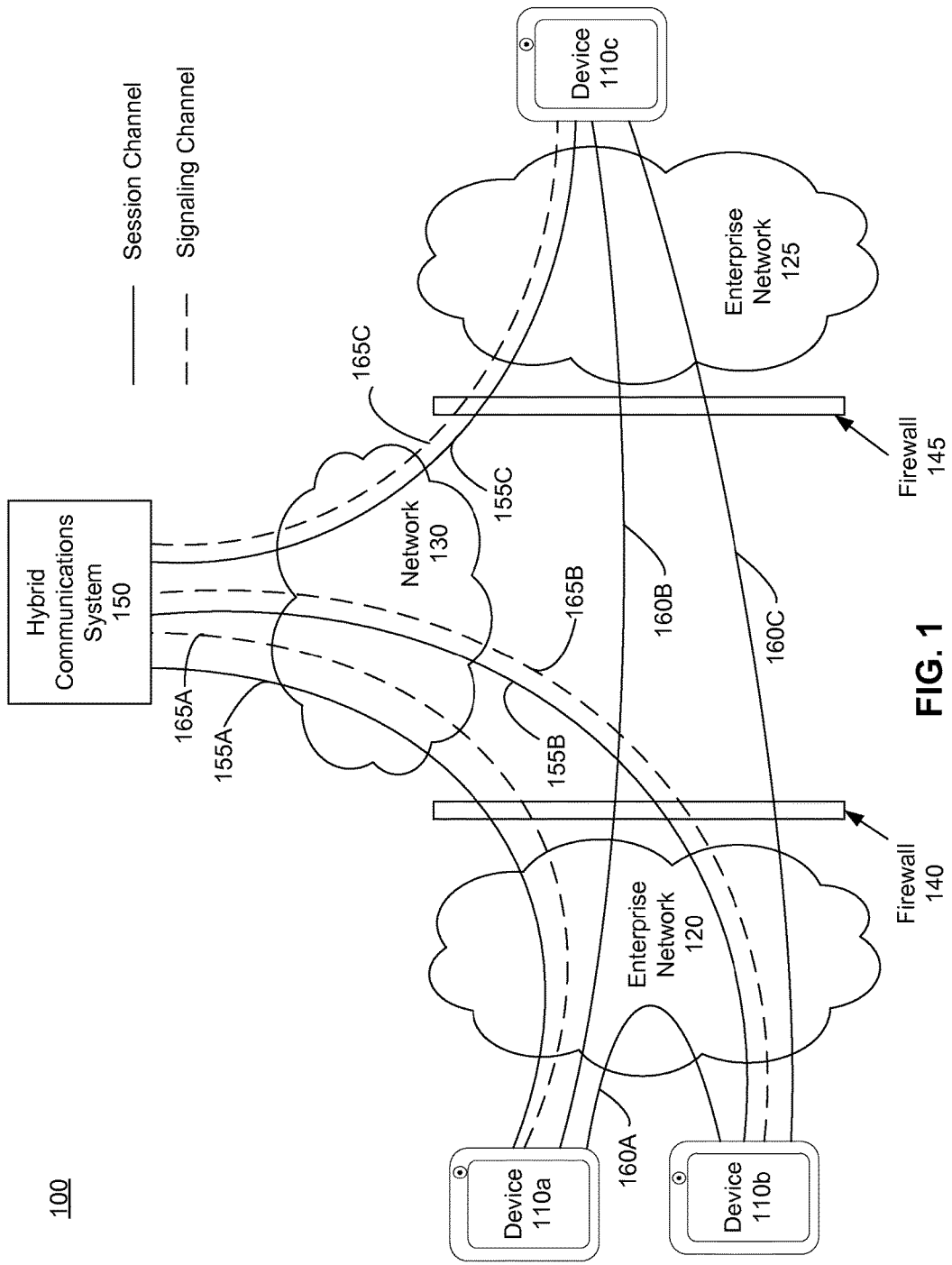
FIG. 1 is a block diagram of a hybrid communication environment, according to an example embodiment of the present disclosure.

The figures depict various example embodiments of the present disclosure for purposes of illustration only. One skilled in the art will readily recognize from the following discussion that other example embodiments based on alternative structures and methods may be implemented without departing from the principles of the disclosure.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

The above and other needs are met by the disclosed methods, a non-transitory computer-readable storage mediums storing executable code, and systems for conducting a hybrid media session.

In one embodiment, a hybrid communications system performs a method for conducting a hybrid media session. The method comprises estimating a quality of service for each of a plurality of session channels available to couple a first electronic device on a first network with a second electronic device on a second network, the plurality of session channels including a peer-to-peer session channel and a server-controlled session channel. The hybrid communications system selects a first session channel, from the plurality of session channels, where the selected first session channel has a highest estimated quality of service of all the plurality of session channels over a first time interval. The hybrid communications system instructs the first electronic device via a first signaling channel and a second electronic device via a second signaling channel to establish a hybrid media session using the first session channel such that media data is communicated on the first session channel. The hybrid communications system monitors during the hybrid media session the estimated quality of service for the plurality of session channels, and responsive to the monitoring, selects a second session channel, from the plurality of session channels, where the selected second session channel has a highest estimated quality of service of all the plurality of session channels over a second time interval that occurs subsequent to the first time interval. Responsive to the selecting, the hybrid communications system instructs the first electronic device via the first signaling channel and the second electronic device via the second signaling channel to establish the hybrid media session using the second session channel such that media data is communicated on the second session channel and not the first session channel.

In another embodiment, a hybrid communications system for conducting a hybrid media session comprises a processor configured to execute modules and a memory storing the modules. The modules include a quality of service module configured to estimate a quality of service for each of a plurality of session channels available to couple a first electronic device on a first network with a second electronic device on a second network, the plurality of session channels including a peer-to-peer session channel and a server-controlled session channel. The quality of service module is also configured to select a first session channel, from the plurality of session channels, where the selected first session channel has a highest estimated quality of service of all the plurality of session channels over a first time interval. The modules also include a control server configured to instruct the first electronic device via a first signaling channel and a second electronic device via a second signaling channel to establish a hybrid media session using the first session channel such that media data is communicated on the first session channel. The quality of service module is also configured to monitor during the hybrid media session the estimated quality of service for the plurality of session channels, and responsive to the monitoring, select a second session channel, from the plurality of session channels, where the selected second session channel has a highest estimated quality of service of all the plurality of session channels over a second time interval that occurs subsequent to the first time interval. The control server is also configured to responsive to the selecting, instruct the first electronic device via the first signaling channel and the second electronic device via the second signaling channel to establish the hybrid media session using the second session channel such that media data is communicated on the second session channel and not the first session channel.

In another embodiment, hybrid communications system for conducting a hybrid media session comprises a processor configured to execute modules and a memory storing the modules. The modules include a quality of service module configured to estimate a quality of service for each of a plurality of session channels available to couple a first electronic device on a first network with a second electronic device on a second network, the plurality of session channels including a peer-to-peer session channel and a server-controlled session channel. The quality of service module is also configured to determine that a peer-to peer media session was established previously between the first electronic device and the second electronic device on the peer-to-peer session channel, and responsive to the determination, positively weight the quality of service for the peer-to-peer session channel relative to the server-controlled session channel. The quality of service module is also configured to select a first session channel, from the plurality of session channels, where the selected first session channel has a highest estimated quality of service of all the plurality of session channels over a first time interval. The modules also include a control server configured to instruct the first electronic device via a first signaling channel and a second electronic device via a second signaling channel to establish a hybrid media session using the first session channel such that media data is communicated on the first session channel. The quality of service module is also configured to monitor during the hybrid media session the estimated quality of service for the plurality of session channels, and responsive to the monitoring, select a second session channel, from the plurality of session channels, where the selected second session channel has a highest estimated quality of service of all the plurality of session channels over a second time interval that occurs subsequent to the first time interval. The control server is also configured to, responsive to the selecting, instruct the first electronic device via the first signaling channel and the second electronic device via the second signaling channel to establish the hybrid media session using the second session channel such that media data is communicated on the second session channel and not the first session channel.

A hybrid communications system has a number of advantages over conventional communication systems. The quality of session channels has a tendency to vary with time, such that for different time periods different session channels would provide the highest session quality. Conventional systems may conduct a media session from start to finish on a single session channel. In contrast, the hybrid communications system actively selects, monitors, and possibly changes which session channel a hybrid media session is occurring over as a function of the session channels quality of service. Accordingly, the hybrid communications system may provide users with a hybrid media session having an average quality of service that is higher than other conventional systems.

Additionally, in some embodiments, the hybrid communications system keeps open previously active session channels during a given hybrid media session. This provides the hybrid communications system a way to make one the previously active session channels again active, without having to spend time re-establishing that channel.

Another advantage is that as a plurality of session channels are available to conduct a hybrid media session, in the communication system is more robust. For example, if an active peer-to-peer session channel fails, the hybrid communications system can continue the hybrid media session using some other session channel (e.g., internet fails, and the hybrid communications system recovers the session via a cellular network or a public switched telephone network).

FIG. 1 is a block diagram of a hybrid communication environment 100, according to an example embodiment of the present disclosure. The hybrid communication environment 100 includes devices 110a and 110b, and 110c that are part of enterprise networks 120 and 125, respectively, and each coupled by a network 130 to a hybrid communications system 150. The devices 110a, 110b, and 110c can also connect to one another via one or more types of peer-to-peer connections. Here, only three electronic devices and one hybrid communications system 150 are illustrated, but there can be multiple instances of each of these entities. For example, there can be hundreds of devices 110 in communication with one or more hybrid communications system 150.

The network 130 provides a communication infrastructure between the devices 110 and the hybrid communications system 150. The network 130 is typically the Internet, but can be any network, including but not limited to a Metropolitan Area Network (MAN), a Wide Area Network (WAN), a public land mobile network (PLMN) which is also referred to as a wireless wide area network (WWAN) or a cellular network, a public switched telephone network (PTSN), or some combination thereof.

The enterprise networks 120, 125 allow the electronic devices 110a-c to interact with the hybrid communications system 150. In some embodiments, enterprise networks 120, 125 can be an enterprise or business system. In some embodiments, the enterprise networks 120, 125 includes more than one network and is located in multiple geographic areas. The enterprise networks 120, 125 each include one or more local area networks. In some embodiments, the local area networks use standard communications technologies and/or protocols. Thus, local networks, and in effect, the enterprise networks 120, 125 can include links using technologies such as Ethernet, 802.11 standards, worldwide interoperability for microwave access (WiMAX), WiFi, 3G, digital subscriber line (DSL), etc. Enterprise networks 120 and 125 are connected to the network 130 through firewall 140 and firewall 145, respectively.

Each of the devices 110a-c can participate in media sessions with each other and/or other devices, and the devices 110a-c and/or other devices can be referred to as a device 110. A device 110 is an electronic device, such as cell phone, smart phone, desktop phone with a display, audio and/or video conferencing device, tablet, computer, gaming console, or some other device. A media session refers to passing media data on one or more session channels for audio and/or video communications negotiated (or in the process of being negotiated) by two communications systems where media data is passed on the one or more session channels. A media session can have a "lifetime" from when it is initiated to when it is terminated. During the lifetime of a media session, data channels can be added and removed.

A session channel refers to the combination of a) a format for the media data of the session channel; and b) a transport method for transporting the media data between the two communications systems of the media session to which the session channel belongs. In general, the media data format of a session channel can be audio and/or video. More specifically, the media data format can be a standardized packet format such as, for example, the Real-time Transport Protocol (RTP) for streaming the audio and/or video media data in data packets over one or more packet-switched data networks between the two communications systems. The transport method can be any suitable method for establishing media data streams between the two communications systems. Some possible transport methods include, but are not limited to, the User Datagram Protocol (UDP) and the Transmission Control Protocol (TCP).

A session channel can be centralized session channel 155A, 155B, 155C or a peer-to-peer (P2P) session channel 160A, 160B, 160C. A centralized session is one in which media data is received by the hybrid communications system 150 which then relays the media data to other devices 110 participating in the centralized session via centralized session channels that couple the participating devices 110 to the hybrid communications system 150. For example, if a user of a participating device 110a speaks into a microphone associated with the device 110a during a centralized media session, the audio signal is encoded as media data by device 110a, and then sent to the hybrid communications system 150 through a centralized session channel. The hybrid communications system 150 then relays the media data to other participating devices (e.g., 110b and/or 110c) through their respective centralized session channels (e.g., 155B, 155C), to be output by speakers at those devices so users of those devices can hear what the user of device 110a said.

A peer-to-peer (P2P) media session refers to a media session in which the media data of the P2P media session is not relayed between the two communications systems of the media session by the hybrid communications system 150 or some other central server that performs media data mixing and/or transcoding functions. Instead a P2P media session occurs over one or more P2P session channels. The transport methods of a P2P session channel can leverage Network Address Translation (NAT) traversal protocols for establishing media streams between the peer communications systems. Some possible NAT traversal protocols include the Session Traversal Utilities for NAT (STUN) protocol and the Interactive Connectivity Establishment (ICE) protocol. FIG. 1 illustrates an example P2P session channel 160A between devices 110a and 110b, an example P2P session channel 160B between devices 110a and 110c, and an example P2P session channel 160C between devices 110b and 110c. While FIG. 1 illustrates a single P2P channel between each of the devices 110a, 110b, and 110c, in some embodiments, one or more of the P2P session channels 160A, 160B, 160C can be represent multiple P2P session channels.

A hybrid media session refers to a media session that passes media data on different session channels at different times during the hybrid media session based on which of the session channels has a highest quality of service (QoS). For example, in a hybrid media session media data can be passed on different session channels at different time intervals during the hybrid media session. In each of these time intervals, the session channel passing media data has the highest QoS. A given hybrid media session is associated with a plurality of session channels. The plurality of session channels includes one or more P2P session channels and one centralized session channel. An active channel is the session channel being used to pass media data for a particular time interval.

FIG. 1 illustrates a signaling channel 165A, 165B, and 165C, between the hybrid communications system 150 and devices 110a, 110b, and 110c, respectively. The signaling channels are used to pass signaling data between the devices 110 and the hybrid communications system 150. Signaling data is information used to control a hybrid media session, a media session, or both. Signaling data can include, for example, data for initiating, accepting, managing, changing session channel, and terminating an associated media session. Signaling data sent over signaling channels can conform to a signaling network protocol such as, for example, the Session Initiation Protocol (SIP) and the H.323 protocol. While FIG. 1 illustrates a single signaling channel 165 between each of the devices 110a, 110b, and 110c and the hybrid communications system 150, in some embodiments, one or more of the signaling channels 165A, 165B, 165C can be represent multiple signaling channels.

The hybrid communications system 150 establishes a hybrid media session via requests received on the signaling channels 165A-C. As discussed below in detail with regard to FIGS. 2 and 3, the hybrid communications system 150 receives request to initiate hybrid media sessions via the signaling channels 165A-C from one or more devices 110. In some embodiments, the requests can include invitations to other devices 110 to participate in a hybrid media session with the requesting device 110. The hybrid communications system 150 communicates with the other devices 110 to provide them an option of participating in the hybrid media session with the requesting device 110.

The hybrid communications system 150 controls which session channels are used for hybrid media sessions between devices 110. As discussed in detail below with regard to FIGS. 2 and 3, for a group of devices 110 requesting to participate in a hybrid media session, the hybrid communications system 150 determines a quality of service (QoS) for each of the plurality of session channels associated with the requested hybrid media session. The determined QoS is based on, for example, bandwidth, jitter, connection history information, voice quality, etc. The hybrid communications system 150 selects a session channel, of the plurality of session channels, that has a highest QoS. The hybrid communications system 150 then notifies the participating devices 110 of the selected session channel and instructs them to establish a hybrid media session via the selected channel. The selected session channel can be, e.g., one or more P2P connections or a centralized session channel. Additionally, as discussed in detail below with regard to FIGS. 2 and 3, in some embodiments where a P2P connection is selected the communications system can verify and/or update connection parameters (e.g., firewall access information, codecs, etc.) to facilitate establishment of the hybrid media session over the P2P connection. Moreover, the communications server 150 can configure the firewalls 140 and/or 145 that would not normally allow a P2P session to allow a P2P session for at least the duration of the P2P media session.

The hybrid communications system 150 monitors the QoS for each of the plurality of session channels associated with the hybrid media session. If the hybrid communications system 150 identifies a session channel, other than the active session channel, as having a highest QoS, the hybrid communications system 150 instructs the participating devices 110 to establish the hybrid media session on the identified session channel. In some embodiments, the hybrid communications system 150 also instructs the participating devices 110 to keep the previously active session channel open (i.e., do not terminate the connection), in effect "pausing" use of the previously active session channel. Additionally, if at some later time a third session channel has the highest QoS, the hybrid communications system 150 instructs the participating devices 110 to establish the hybrid media session on the identified third session channel and keep the other two session channels open. As the hybrid media session continues, the hybrid communications system 150 instructs the participating devices 110 to provide media data on whichever session channel has the highest QoS. This allows a hybrid media session established in the hybrid communication environment 100 to change established session channels without having to spend time terminating and re-establishing session channels.

In other embodiments, if the hybrid communications system 150 identifies a session channel, other than the active session channel, as having a highest QoS, the hybrid communications system 150 instructs the participating devices 110 to establish the hybrid media session on the identified session channel, and terminate the previously active session channel. In this manner, the hybrid communications system 150 and/or the participating devices 110 are not expending system resources keeping a session channel open that is not being used.

The QoS of a particular session channel has a tendency to vary with time. For example, sudden network loads my negatively affect bandwidth of an associated session channel. Conventional systems can conduct a media session from start to finish on a single session channel, and thus QoS can vary significantly for a given media session. In contrast, the hybrid communications system 150 actively selects, monitors, and possibly changes which session channel a hybrid media session is occurring over as a function of the session channels QoS. Accordingly, the hybrid communications system 150 can provide users with a hybrid media session having an average QoS that is higher than other conventional systems.

In some embodiments, the hybrid communications system 150 operates in a client-server architecture, where hybrid communications system 150 serves client devices such as devices 110a-c based on any requests received from the client devices. Some of the functions that hybrid communications system 150 can perform include receiving, hosting, storing, and providing data associated with location of the client devices as well as contextual information items associated with the device location. For example, the hybrid communications system 150 includes some or all of: an email server, fax server, application server, communications server, database server, and a group of remote servers. In some example embodiments, hybrid communications system 150 can provide virtual private branch exchange (vPBX) services including telephony, fax, and electronic messages. In an example embodiment, the hybrid communications system 150 manages resources such as communication resources allocated to a premises. For example, hybrid communications system 150 manages telephony or wireless bandwidth resources for an office building.

In alternate embodiments one or more of the devices 110 can be coupled to communications system 150 through a home network and not an enterprise network 120, 125. A home network is a local area network that is coupled to the hybrid communications system via the network, and in some cases a firewall. In some embodiments, the home network uses standard communications technologies and/or protocols. Thus, a home network can include links using technologies such as Ethernet, 802.11 standards, worldwide interoperability for microwave access (WiMAX), WiFi, 3G, digital subscriber line (DSL), etc. For example, device 110a can be coupled to a home network that is coupled to the network 130. In this example, the device 110a would have an additional signaling path and session path to the hybrid communications system 150 that passes through the home network (and possibly a firewall) and the network 130, but the additional paths would not pass through the enterprise network 120. In embodiments using a home network, the hybrid communication system 150 operates in a manner similar to that described in the system 100 shown in FIG. 1, except that one or both of the enterprise networks 120, 125 can be replaced with a home network.

Figure 2:
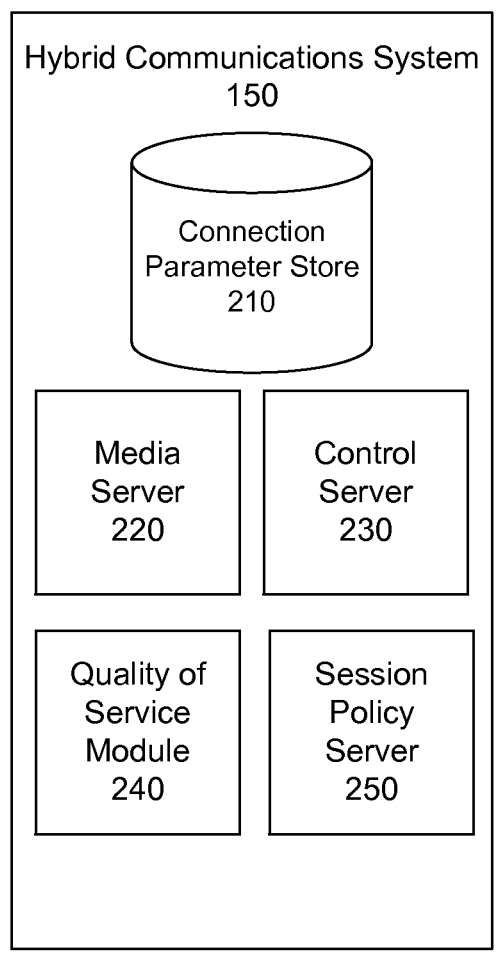
FIG. 2 is a high-level block diagram illustrating a detailed view of modules within the communications system according to an example embodiment

Turning now to a detailed discussion of the communications server 150, FIG. 2 is a high-level block diagram illustrating a detailed view of modules within the hybrid communications system 150 according to an example embodiment. Some embodiments of the hybrid communications system 150 have different modules than those described here. Similarly, the functions can be distributed among the modules in a different manner than is described here. The hybrid communications system 150 is comprised of modules including a connection parameter store 210, a media server 220, a control server 230, a quality of service module 240, and a discovery module 250.

The connection store 210 stores information used by the hybrid communication systems 100. The connection store 210 can store, e.g., a connection parameter lookup table, codecs for various devices 110, some other information used by the hybrid communication system 100, or some combination thereof. The connection parameter lookup table maps one or more devices 110 to corresponding connection parameters. A connection parameter is information associated with a device 110 that is pertinent in establishing a hybrid media session with that device 110. A connection parameter associated with a device 110 can be, for example, a codec version for the device 110, access information for one or more firewalls that are traversed to communicate with the device 110, communication parameters for a device 110, one or more features (e.g., ability to receive audio, video, etc.) of the device 110, connection history information for the device 110, or some combination thereof. Communication parameters are one or more parameters relevant to communicating with a device 110. Communication parameters can include, e.g., an external internet protocol (IP) address of a device 110, an IP address of a wide area network (WAN) address of a router with network address translation (NAT) enabled, an external real-time transport protocol (RTP) port of the device 110, a WAN RTP port of the router with NAT enabled, IP address of the device 110, an origin RTP port of the device 110, some other information relevant to communicating with device 110, or some combination thereof. Connection history information is information describing previously established hybrid media sessions and/or media sessions that the device 110 participated in. For a given previous hybrid media sessions and/or media sessions, connection history information can include, e.g., device IDs for the devices that participated in the hybrid media session or media session, information describing what session channels were used in the hybrid media session or media session, QoS scores for session channels used in the hybrid media session or media session, or some combination thereof.

The media server 220 serves media to devices 110 participating in centralized media sessions. For a given centralized media session including a plurality of devices 110, the media server 220 relays media data received from one device 110 to other devices 110 in the centralized media session. In some embodiments, the media server 220 is configured to mix multiple media data streams together into a same media data stream. Additionally, in some embodiments, the media server 220 is configured to transcode media data from one encoding format to another.

The control server 230 provides signaling data to devices 110 associated with hybrid media sessions via signaling channels. As discussed above, signaling data is information used to control a hybrid media session and can include, for example, data for initiating, accepting, managing, changing session channel, and terminating an associated hybrid media session. For example, the control server 230 can receive a communication from device 110a via a signaling channel to initiate a hybrid media session with device 110b. The control server 230 can also use the signaling channel to accept device 110a's initiation and invite device 110b to participate in a hybrid media session. Similarly, the devices 110 participating in a hybrid media session or the control server 220 can use signaling channels to terminate the hybrid media session.

The quality of service (QoS) module 240 estimates QoS for various media channels that are available for on-going media sessions. Devices 110a, 110b and/or 110c can be in an existing hybrid media session or in the process of initiating a hybrid media session. There are a plurality of session channels available to conduct a hybrid media session between the devices 110a, 110b, and/or 110c. The plurality of session channels includes a centralized session channel and one or more P2P channels. For each session channel, the QoS module 240 determines associated QoS factors. QoS factors are factors that affect QoS. QoS factors can include, for example, error rates, bandwidth, throughput, transmission delay, availability, jitter, or some combination thereof. The QoS module 240 can estimate the QoS factors using feedback from, e.g., the devices 110, media servers (e.g., media server 409 as discussed below with regard to FIGS. 4), and P2P media relay nodes (e.g., P2P media relay node as discussed below with regard to FIG. 4), or any combination thereof. The feedback can be provided via RTP control protocol extended reports (RTP-XR), IETF RFC6035 ("Session Initiation Protocol Event Package for Voice Quality Reporting"), via a private reporting mechanism (e.g., attaching the Qos Factors in SIP BYE message and the response to the SIP BYE), or some other reporting mechanism. For each session channel, the QoS module 240 scores each of the determined QoS factors associated with the session channel to generate a set of factor scores for the session channel. In some embodiments, the QoS module 240 weights one or more of factor scores. For example, a factor score for bandwidth can be weighted higher than a factor score for error rate.

The QoS module 240 then generates a QoS score for the session channel using the factor scores. The QoS score describes an overall quality associated with a session channel. The QoS module 240 can aggregate the factor scores for each of the session channels to generate corresponding QoS scores for each of the session channels. Additionally, the QoS score for the session channel can be weighted by, e.g., session features and/or connection history information. For example, if the connection history information indicates that a P2P media session between 110a, 110b and/or 110c on a P2P session channel has successfully (e.g., occurred for longer than some threshold value of time) occurred in the past, the QoS module 240 increases the QoS score associated with the P2P session channel. Similarly, in some embodiments, the QoS module 240 adjusts the QoS score for a session channel based on what features the session channel provides relative to those allowed by the devices 110a, 110b and/or 110c. For example, if devices 110a, 110b and/or 110c would like to have a hybrid media session that includes video, the QoS module 240 would reduce the weight of session channels that do not provide video capability.

The QoS module 240 selects session channels to establish hybrid media sessions between devices 110a, 110b, and/or 110c. For example, devices 110a, 110b, and/or 110c (participating devices 110) can be in an existing hybrid media session or in the process of establishing a hybrid media session. The QoS module 240 selects a session channel having a highest QoS score of a plurality of session channels available to conduct a hybrid media session between the participating devices 110. The QoS module 240 then notifies the participating devices 110 of the selected session channel via signaling channels, and instructs the control server 220 to instruct the participating devices 110 to establish a hybrid media session over the selected session channel. In some embodiments, where the hybrid media session is currently active on some session channel other than the selected session channel, the QoS module 240 instructs the control server 220 to instruct the participating devices 110 to terminate the previous session channel once the hybrid media session is established over the selected session channel. Alternatively, the QoS module 240 keeps the previous session channel open, and thus would not need to re-establish a connection along the previous session channel if at some later time the QoS module 240 determines that media data is to again be passed on the previous session channel. This allows a the hybrid communications server 150 to change established session channels without having to spend time terminating and re-establishing session channels.

Note that the QoS factors may not be constant, and have a tendency to vary over time. For example, a sudden load on the network may reduce the available bandwidth and hence reduce the associated factor score. To help account for the time varying nature of the QoS factors, the factor scores are generated based on data taken for a time interval. The time interval being greater than an amount of time to fully establish a new session channel (e.g., 500 ms). For example, a typical time interval can be one the order of several seconds, and in some embodiments can be as long as several minutes, or anywhere in between. Thus, the QoS score for each session channel is representative of the QoS over a time interval. This helps prevent the hybrid communications system 150 from continually switching back and forth between session channels due to sudden and brief changes in QoS factors.

Additionally, after a hybrid media session has been established, the QoS module 240 monitors the estimated QoS for session channels associated with the hybrid media session. The QoS module 240 monitors the estimated QoS by continuing to determine QoS scores for session channels associated with the hybrid media session. The session channels associated with the hybrid media session include the session channel that is actively being used by the devices 110 to conduct the hybrid media session as well as one or more alternate session channels.

The session policy server 250 verifies connection parameters using the connection parameter table. For example, in some embodiments, where the selected session channel is a P2P session channel, and it is the first time a P2P session channel has been selected for a given hybrid media session between 110a, 110b and/or 110c, the session policy server 250 validates connection parameters using the connection parameter table in the connection parameter store 210. For example, for a group of participating devices 110, the session policy server 250 checks the connection parameter table to determine whether the codec versions associated with each participating device 110 is up to date.

The session policy server 250 updates connection parameters based on the validation. Continuing the above example, if the codec for a participating device 110 is out of date, the discovery server 230 can instruct the participating device 110 to download a current version of the codec from the connection parameter store 210 or some third party entity. Once the participating device 110 has updated its codec it notifies the session policy server 250 which then updates the connection parameter table to reflect the updated codec of the participating device 110. In embodiments, where a device 110 is not able to upgrade its codec and other participating devices 110 have updated codecs that generally provide additional services, the session policy server 250 can instruct the other participating devices 110 to operate at a reduced capability during a hybrid media session such that the same services are available to all devices 110 that participate in the hybrid media session.

Additionally, in embodiments, where the validation indicates that a firewall between two devices 110 would not normally permit the selected P2P media session channel, the session policy server 250 configures the firewall to allow P2P media session channels between the two devices for at least the duration of the P2P media session. For example, the firewall 140 may allow P2P media sessions and firewall 145 may not normally allow P2P media sessions. The session policy server 250 can configure the firewall 145 to allow a P2P media session for at least the duration of the P2P media session. The session policy server 250 would then provide information used to establish a P2P connection through firewalls 140 and 145 to the devices 110a, 110c.

In alternate embodiments, the session policy server 250 can be part of some other entity. For example, the session policy server 250 can be located at a server operating in one of the enterprise networks 120, 125, or the network 130. In these embodiments, the session policy server 250 can receive a communication from device 110a to initiate a hybrid media session with device 110b. The session policy server 250 then determines using connection history information whether a P2P media session between 110a, and 110b on a P2P session channel has successfully (e.g., occurred for longer than some threshold value of time) occurred in the past. If so, the session policy server 250 instructs the device 110a to attempt to connect to device 110b via the P2P session channel.

Figure 3:
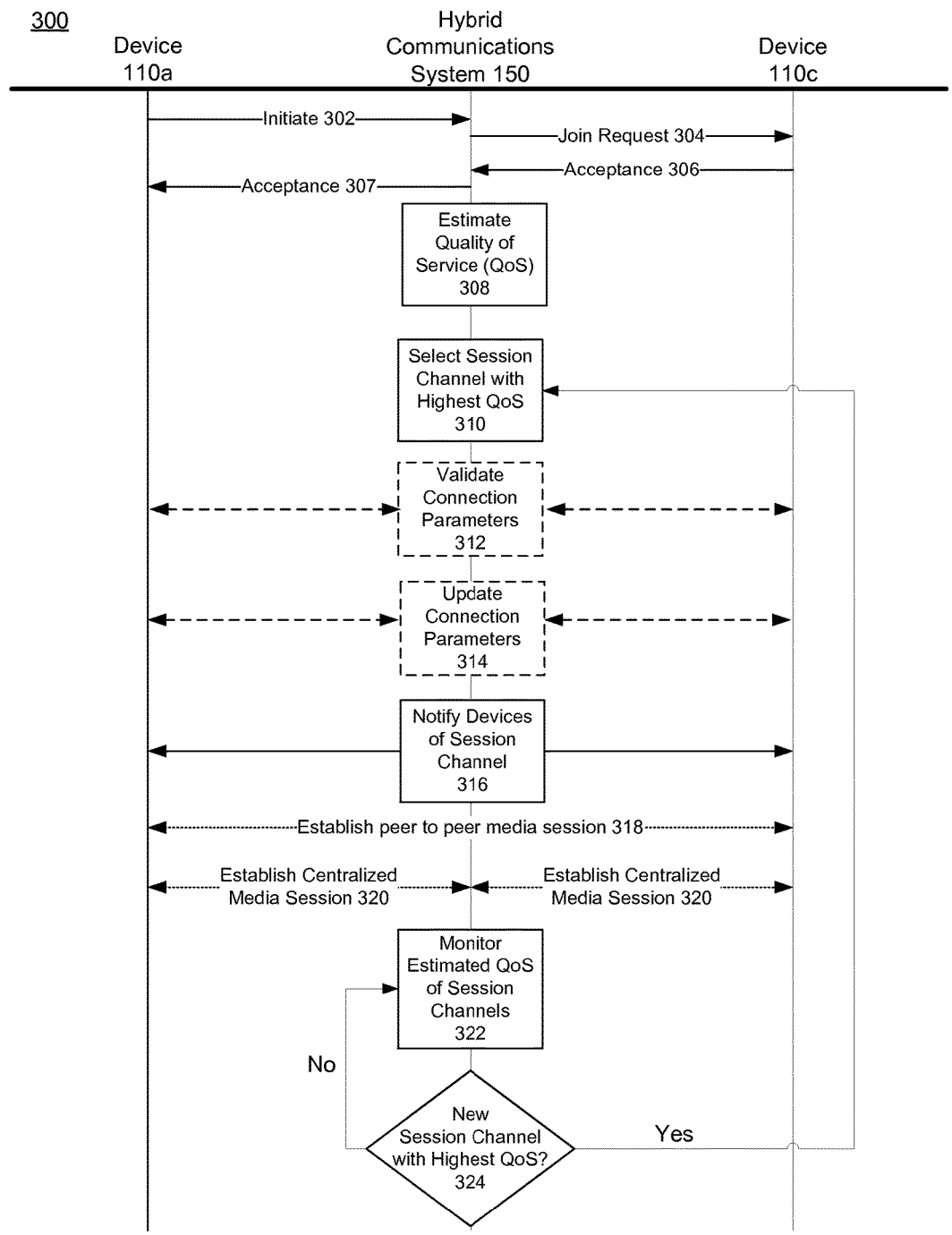
FIG. 3 is an interaction diagram of a process for establishing a hybrid media session using a hybrid communications system.

FIG. 3 is an interaction diagram of a process 300 for establishing a hybrid media session using a hybrid communications system 100, according to an example embodiment. In various embodiments, the process can include different and/or additional steps than those described in conjunction with FIG. 3. Additionally, in some embodiments, the steps can be performed in a different order than described in conjunction with FIG. 3.

At step 302, the hybrid communications system 150 receives from a device 110a over a signaling channel 165A a request to initiate a hybrid media session with a device 110c. The hybrid media session can be an audio and/or video media session. The request includes one or more communication parameters (e.g., an external IP address of a device 110, an external real-time transport protocol (RTP) port of the device 110, etc.). The hybrid communications system generates a session ID identifying the requested hybrid media session. The hybrid communications system 150 acknowledge receipt of the request to initiate the hybrid media session with a return acknowledgement message to the device 110a that includes the session ID. Note acknowledgements sent by entities in FIG. 3 upon receipt of some form of data to a sending entity are omitted from FIG. 3 to help simplify the interaction diagram.

The hybrid communications system 150 sends 304 a request including the session ID to join a hybrid media session to the device 110c over a signaling channel 165C. The request includes some, or all of, the one or more communication parameters associated with device 110a and the session ID for the hybrid media session. In some embodiments, the device 110c prompts a user to accept/deny the request. If the user denies the request, the device 110c notifies the hybrid communications system 150 and no hybrid media session is established. Alternatively if the user accepts the request, the device 110c sends 306 an acceptance to the hybrid communications system 150 over the signaling channel 165C. The acceptance includes one or more communication parameters associated with the device 110c. In other embodiments, the device 110c automatically accepts the request to join the hybrid media session.

Responsive to receiving the acceptance from the device 110c, the hybrid communications system 150 notifies 307 the device 110a of the acceptance via the signaling channel 165A. The notification includes some, or all of, the one or more communication parameters associated with device 110c.

The hybrid communications system 150 estimates 308 a QoS for a plurality of session channels including one or more P2P media session channels and a server-controlled session channel. As discussed above with regard to FIG. 2, the hybrid communications system 150 estimates the QoS factors (e.g., jitter, bandwidth, etc.) using, e.g., feedback (e.g., RTP-XR) received from the devices 110, media servers (e.g., media server 409 as discussed below with regard to FIGS. 4), and P2P media relay nodes (e.g., P2P media relay node as discussed below with regard to FIG. 4), or any combination thereof. The estimated values are used to generate a QoS score for each of the session channels. In some embodiments, hybrid communications system 150 weights the QoS score for each session channel by available session features. In some embodiments, hybrid communications system 150 positively weights the QoS score for P2P session channels if the connection history information indicates that a P2P media session successfully occurred (e.g., occurred for longer than some threshold value of time) in the past. The hybrid communications system 150 then selects 310 the session channel with the highest QoS score.

In some embodiments, where the selected session channel is a P2P session channel and it is the first time a P2P session channel has been selected for the hybrid media session, the hybrid communications system 150 validates 312 connection parameters (e.g., codec version, access information for one or more firewalls, etc.) using a connection parameter table. The hybrid communications system 150 updates 314 connection parameters based on the validation For a given device 110, if the validation shows one or more of the connection parameters should be updated, the hybrid communications system 150 updates the device 110 with a correct connection parameter or instructs the device 110 to obtain the updated connection parameter. For example, if the codec for 110c is out of date, the hybrid communications system 150 can instruct the device 110c to download a current version of the codec from itself or some third party entity. Once the device 110c has updated its codec it notifies the hybrid communications system 150 which then updates the connection parameter table to reflect the updated codec of the device 110c. In embodiments, where a device 110c is not able to upgrade a codec, the hybrid communications system 150 instructs the other devices 110a to operate at a reduced capability during the hybrid media session such that the same services are available to all devices 110a and 110c.

Additionally, in embodiments, where validation indicates that a firewall between two devices 110 would not normally permit P2P media session channels, the hybrid communications system 150 configures the firewall to temporarily allow P2P media session channels between the two devices for at least the duration of the hybrid media session. For example, firewall 140 may allow P2P media session and firewall 145 may not normally allow P2P media sessions. The hybrid communications system 150 can configure the firewall 145 to temporarily allow a P2P media session. The hybrid communications system 150 would then provide information used to establish a P2P connection through firewalls 140 and 145 to the devices 110a, 110c.

Alternatively, if the hybrid media session was at some point previously established using a P2P session channel between devices 110a and 110c, or the selected session channel is a centralized session channel, steps 312 and 314 are not performed, and the flow moves from step 310 to step 316.

The hybrid communications system 150 notifies 316 the devices 110a and 110c of the session channel selected in step 310 via signaling channels 165A and 165C, respectively. In embodiments, where the selected session channel is a P2P session channel (e.g., 160B), the hybrid communications system 150 instructs the devices 110a and 110c to establish a P2P media session over the selected P2P session channel 106B, such that media data is communicated on the P2P session channel 160B. The devices 110a and 110c then establish 318 the P2P media session over the selected P2P session channel such that media is being passed between the devices 110a and 110c via the P2P media channel. The signaling of the media session is still handled via the hybrid communications system 150 via signaling channels 165A and 165C.

In embodiments, where the selected session channel is a centralized session channel, the hybrid communications system 150 establishes 320 a centralized media session with the devices 110a and 110c via centralized session channels 155A and 155C, respectively, such that media data is communicated via the centralized session channels 155A and 155C. The signaling of the hybrid media session is still handled via the hybrid communications system 150 via signaling channels 165A and 165C.

The hybrid communications system 150 monitors 322 the estimated QoS of the plurality of session channels. The QoS scores associated with one or more of the plurality of session channels can vary over time. If a different session channel has a highest QoS score for more than a threshold period of time, the hybrid communication system 150 determines that the different session channel has a highest QoS, and the interaction diagram moves to step 310.

In some embodiments, once the hybrid media session is established (e.g., 318 or 320) on the different session channel, the communications server 150 instructs the devices 110a and 110c continue to conduct the media session via the different session channel, but keep the previously active session channel open. The hybrid communications system 150 can then instruct devices 110a and 110c to provide data on either path in accordance with its associated QoS. This allows a hybrid media session established in the hybrid system 100 to go back and forth between session channels without having to spend time terminating and re-establishing session channels. While two session channels are discussed above, there can be more than two session channels, for example a plurality of P2P session channels and a centralized session channel. For example, at some later time a third session channel has the highest QoS, the hybrid communications system 150 instructs the participating devices 110 to establish the hybrid media session on the identified third session channel. In some embodiments, the other two session channels remain open. As the hybrid media session continues, the hybrid communications system 150 instructs the participating devices 110 to provide media data on whichever session channel has the highest QoS. This allows the hybrid communications system 150 to change established session channels during the hybrid media session without having to spend time terminating and re-establishing session channels. In other embodiments, once the new session channel is established (318 or 320), the communications server 150 terminates the prior selected session channel, and the devices 110a and 110b continue to conduct the hybrid media session via the newly established session channel.

The above process continues until the hybrid media session is terminated by one or more of the devices 110. The process 300 actively selects, monitors, and possibly changes which session channel a hybrid media session is occurring over as a function of the session channel's QoS. Accordingly, the process 100 can provide the users with a hybrid media session having an average QoS that is higher than other conventional systems.

Figure 4:
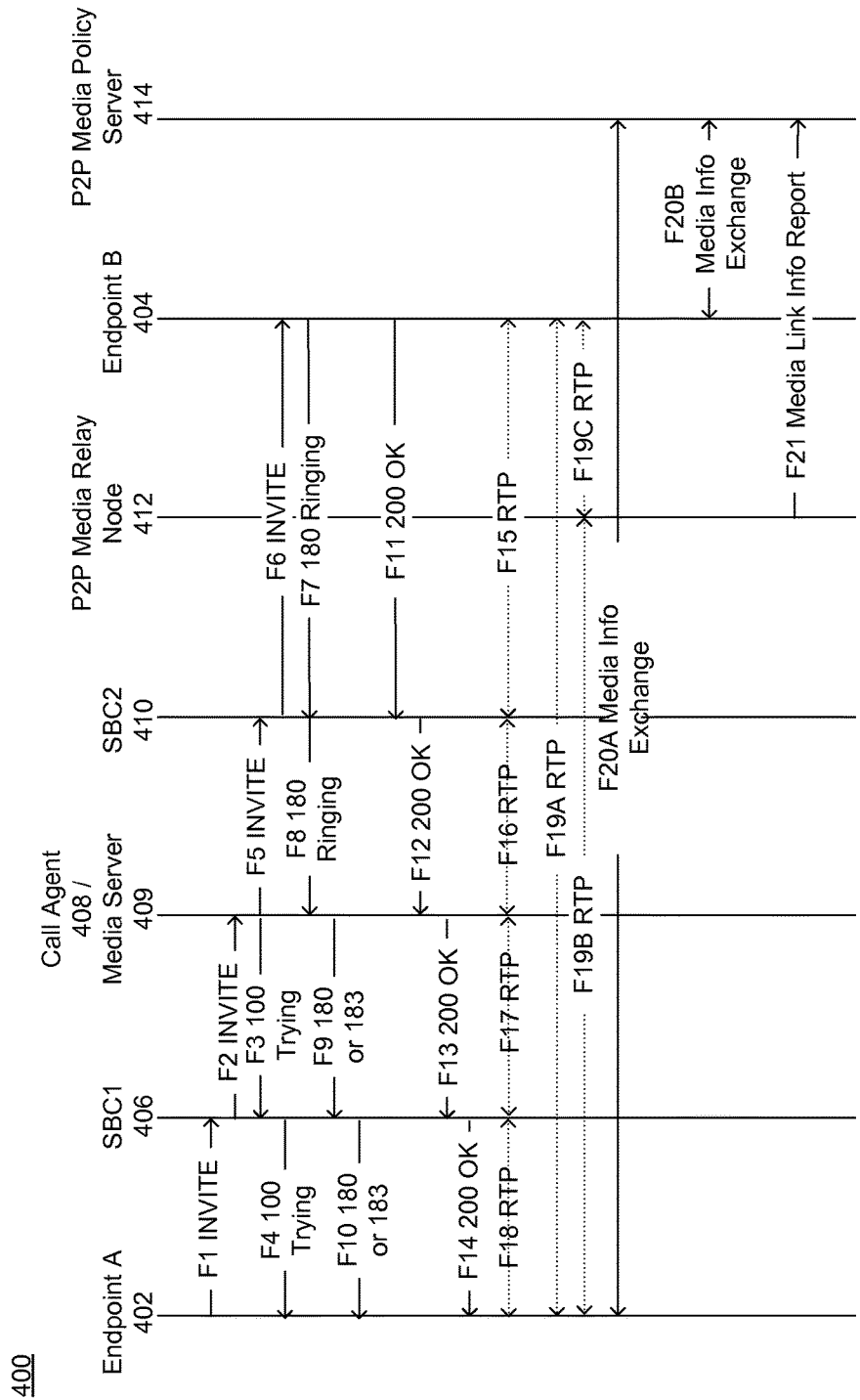
FIG. 4 is a wire diagram of a process for establishing a hybrid media session using a hybrid communications system, according to an example embodiment.
Figure 5:
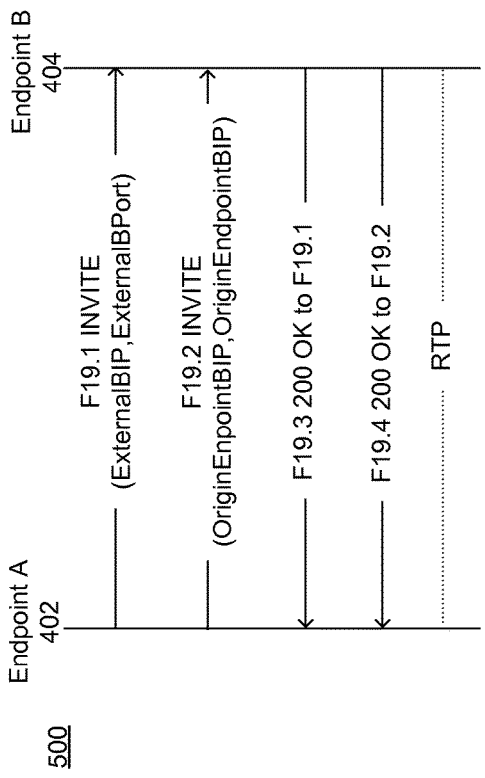
FIG. 5 is a wire diagram of a process for establishing a peer-to-peer session in the hybrid communications system of FIG. 4, according to an example embodiment.
Figure 6:
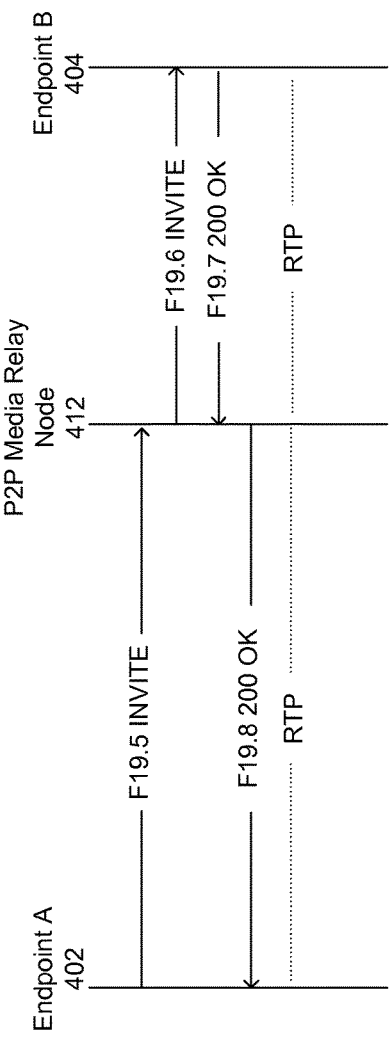
FIG. 6 is a wire diagram of a process for establishing a peer-to-peer session channel between endpoints A and B via a peer-to-peer media relay node in the hybrid communications system of FIG. 4, according to an example embodiment.

FIGS. 4-6 are wire diagrams explaining in detail an example process for conducting a hybrid media session using a hybrid communications system 100. FIG. 4 is a wire diagram of a process 400 for establishing a hybrid media session using a hybrid communications system 400, according to an example embodiment. In various embodiments, the process can include different and/or additional steps than those described. Additionally, in some embodiments, the steps can be performed in a different order.

An endpoint A 402 (e.g., device 110a) sends F1 an invite (also referred to as invitation) to a SBC1 (session boarder controller) 406. The SBC1 406 is located at e.g., the hybrid communications system 150. The SBC1 406 sends F2 an invite to a call agent 408 on the hybrid communications system 150. The call agent 408 is located at, e.g., the hybrid communications system 105, and handles signaling communications endpoints and receives and/or transmits signaling data via signaling channels coupled to endpoint A 402 and endpoint B 404. The call agent 408 at step F3 notifies the SBC1 406 that it is received the request and needs time to handle it, and at step F4 the SBC1 406 provides a similar message to the endpoint A 401. The three digit numbers indicated in steps F3 and F4 are SIP codes (and similarly in some other illustrated steps), which are defined by IETF RFC3261. For example, step F3 includes a "100" which is the SIP code for "Trying."

Responsive to receipt of the invite sent at F2, the call agent 408 initiates a new invitation based on the SIP request URI of F2 which is based on F1. The call agent 408 then sends F5 an invitation to the SBC2 410, which then sends F6 an invite via a signaling channel to an endpoint B 404 (e.g., device 110b or device 110c) to join a media session. The invitation includes some, or all of, the communication parameters associated with the endpoint A 402. Communication parameters can include, e.g., an external IP address of the endpoint A 402 (e.g., an IP address of a wide area network (WAN) address of a router with NAT enabled or an IP address of the endpoint A 402), an external RTP port of the endpoint A 402 (e.g., a WAN RTP port of the router with NAT enabled or an RTP port of the endpoint A 402), IP address of the endpoint A 402, an origin RTP port of the endpoint A 402, some other information relevant to communicating with endpoint A 402, or some combination thereof. In step F7 the SBC2 410 is notified that the endpoint B 404 is "ringing" and that the system is waiting for the endpoint B 404 to answer the call. The SBC2 410 replays this message at step F8 to the call agent 408. The call agent 408 matches the record in the servers (e.g., hybrid communications system 150), and creates a new 180 at step F9 to SBC1 406 which forwards the ringing information at step F10 to the endpoint A 402. In embodiments where the call agent 408 uses the 180 SIP code for F9 and F10, then the Endpoint A 402 generates the ring back tone locally in the endpoint A 402. In embodiments where the call agent 408 is using a 183 SIP code for F9 or F10, then the Endpoint A 402 plays the media (e.g. greeting) from the media server 409.

At steps F11-F14, the endpoint B 404 provides, via the SBC2 410, the call agent 408 and SBC1 406, some, or all of, its associated communication parameters to endpoint A 402. Once this is complete both endpoints have the RTP information of each other and are able to establish a hybrid media session with each other. Accordingly, endpoints A and B can establish a centralized media session via, e.g., steps F15-F18.

In some embodiments, the endpoints can establish one or more P2P session channels in steps F19A that occur between the endpoints A 402 and B 404, and are shown in detail in FIG. 5. FIG. 5 is a wire diagram of a process 500 for establishing a P2P session in the hybrid communications system 400 of FIG. 4, according to an example embodiment. In various embodiments, the process can include different and/or additional steps than those described in conjunction with FIG. 5. Additionally, in some embodiments, the steps can be performed in a different order than described in conjunction with FIG. 5. Endpoint A 402 attempts to connect to endpoint B 404 directly using a new invite. Endpoint A 402 sends at F19.1 an invite to the external IP address of the endpoint (can be WAN IP address of the router with NAT enabled) and the external RTP port (can be WAN RTP port of the router with NAT enabled) of endpoint B 404, and sends at F19.2 an invite to the IP address and to the origin RTP port of endpoint B 404. If the invite from step F19.1 is received, the endpoint B 404 sends an acknowledgement at F19.3, and if the invite from step F19.2 is received, the endpoint B 404 sends an acknowledgement at F19.4. A P2P media session can be established if endpoint A 402 receives at least one of the acknowledgements.

Concurrent with establishing a P2P session channel directly between the endpoints A 402 and B 404, the endpoints attempt to establish a session channel over a P2P media relay node 412 as shown in steps F19B and F19C in FIG. 4, and is shown in detail in FIG. 6. FIG. 6 is a wire diagram of a process 600 for establishing a P2P session channel between endpoints A and B via a P2P media relay node 412 in the hybrid communications system 400 of FIG. 4, according to an example embodiment. In various embodiments, the process can include different and/or additional steps than those described in conjunction with FIG. 6. Additionally, in some embodiments, the steps can be performed in a different order than described in conjunction with FIG. 6.

The endpoint A 402 sends an invite at step F19.5 to the P2P media relay node 412 that includes a session ID. The P2P media relay node 412 replaces the IP address in the invitation from endpoint A 402, including the IP address and the transport port for the SIP response to come back and the IP address and the transport port to receive the media from the endpoint B 404. The P2P media relay node 412 forwards the modified invitation at step F19.6 to the endpoint B 404. The endpoint B 404 sends at step F19.7 an OK of the received modified invitation to endpoint A 402, and an RTP connection between the P2P media relay node 412 and endpoint A 402 is established. Heartbeat messages can be exchanged between the endpoint A 402 and the P2P Media Relay Node 412, and similarly heartbeat messages can be exchanged between the endpoint B 404 and the P2P media relay node 412. In general, a heartbeat message is a message that enables an endpoint to identify if and when the other endpoint fails or is no longer available. The F19.5-F19.8 messages are special heartbeat messages, which can be used to set up a media relay between the endpoint A 402 and the endpoint B 404. Additional heartbeat messages can be used to keep the link alive between P2P media relay 412 and the endpoint A 402 and the endpoint B 404.

The P2P media relay node 412 modifies a signaling data path of the invite with a RTP port created in the P2P media relay node 412 and the IP address of the P2P media relay node 412, and then sends at step F19.6 the modified invite to the endpoint B 404. In embodiments, where endpoint B 404 is not able to create an additional P2P session channel, endpoint B 404 rejects the modified invite. Alternatively, in embodiments where endpoint B 404 is able to create an additional P2P session channel, the endpoint B 404 accepts the modified invite and sends an OK at step F19.7. The P2P media relay node 412 modifies the SDP of the OK from endpoint B 404 with a RTP port created in the P2P media relay node 412 and the IP address of the P2P media relay node 412, and then forwards at F19.8 the modified OK to endpoint A 402. The P2P media relay node 412 then acts as a packet relay for data passed from endpoint A 402 to endpoint B 404, and versa.

Turning back to FIG. 4, the endpoints A 402 and B 404 report at F20A and F20B some QoS factors to a P2P media policy server 414 (e.g., hybrid communications system 150). Additionally, at F21 the P2P media relay node 412 provides F21 additional QoS factors to the P2P media policy server. In some embodiments, the QoS factors are provided periodically (e.g., every few seconds, few minutes, etc.). Alternatively, the QoS factors can be provided if one or more fall below some threshold value. In some embodiments, the QoS factors are provided via, e.g., RTP-XR, IETF RFC6035, etc. In embodiments (e.g., where several media paths are being merged into a single media path) the QoS factors also includes overall voice quality. The QoS factors can also describe which endpoints are contributing to playback (e.g., which are providing audio input versus which are silent). As described above with regard to FIGS. 2 and 3, the hybrid communications system 150 uses the QoS factors to determine a QoS for each session channel, and add, switch, terminate, or pause one or more session channels.

The SBC1 406 and SBC2 410 assist endpoint A 402 and endpoint B 404 finish the NAT transversal. In current industry implementation, all of the call control (e.g. SIP messages) goes through a SBC to reach a call agent, and the SBC removes the session description protocol (SDP) in an invite that is received from end points, and constructs a new SDP to replace the old SDP. The SDP contains the IP address, the media UDP port and the media codec of the end points. In this manner, the current industry implementation ensures that a media session from/to the end points can go through respective SBCs to reach a media server.

The SBC1 406 and SBC2 410 in the hybrid communications system 400 can operate as conventional systems, however, they also can keep the old SDP—which differs from the conventional system described above. Keeping the old SDP ensures the original SDP in the INVITE of the endpoint A 402 and endpoint B 404 are visible to each other (and potentially other endpoints) so that they can conduct a P2P media session. In some embodiments, the SBC1 406 and SBC2 410 modify the INVITE messages, including headers and SDP, but do not handle the call logic (or call control). In alternate embodiments, the hybrid communications server 150 can make the original SDP of the endpoint A 402 and endpoint B 404 visible to each other (and potentially other endpoints) using e.g., session traversal utilities for NAT (STUN), traversal using relay NAT (TURN), interactive connectivity establishment (ICE), or some other method.

Figure 7:
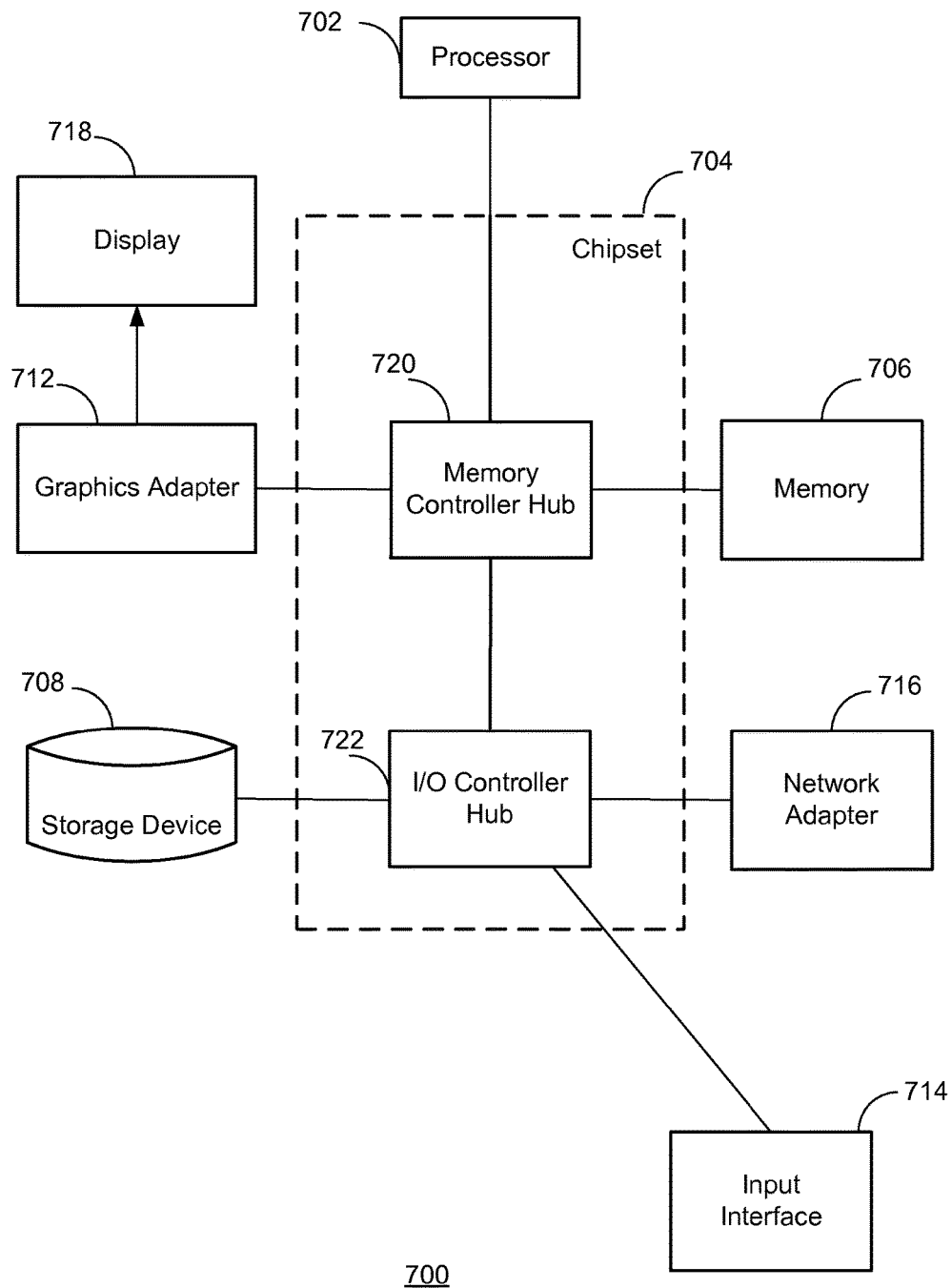
FIG. 7 is a high-level block diagram illustrating an example computer for implementing the entities shown in FIG. 1.

FIG. 7 is a high-level block diagram illustrating an example computer 700 for implementing the entities shown in FIG. 1. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, input interface 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 can be configured to receive input (e.g., commands) from the input interface 714 via gestures from the user. The graphics adapter 712 displays images and other information on the display 718. The network adapter 716 couples the computer 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used by the entities of FIG. 1 can vary depending upon the embodiment and the processing power required by the entity. For example, the hybrid communications system 150 might comprise multiple blade servers working together to provide the functionality described herein. The computers 700 can lack some of the components described above, such as keyboards, graphics adapters 712, and displays 718.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

What is claimed is:
1. A method comprising:
estimating a quality of service for each of a plurality of session channels available to couple a first electronic device on a first network with a second electronic device on a second network, the plurality of session channels including a peer-to-peer session channel and a server-controlled session channel;

selecting a first session channel, from the plurality of session channels, that has a highest estimated quality of service of all the plurality of session channels over a first time interval, wherein the first session channel is the peer-to-peer channel;

instructing the first electronic device via a first signaling channel and a second electronic device via a second signaling channel to establish a hybrid media session using the first session channel such that media data is communicated on the first session channel;

instructing the first electronic device via the first signaling channel to operate at a reduced capability during the hybrid media session such that a second set of services, and not a first set of services, are available to the first electronic device;

identifying at least one connection parameter associated with the second electronic device for update, the at least one connection parameter being access information for a firewall existing between the first electronic device and the second electronic device, the firewall being configured to block peer-to-peer media sessions; and configuring the firewall to allow the peer-to-peer session channel between the first electronic device and the second electronic device.

2. The method of claim 1, further comprising:
monitoring, during the hybrid media session, the estimated quality of service for the plurality of session channels;

responsive to the monitoring, selecting a second session channel, from the plurality of session channels, that has a highest estimated quality of service of all the plurality of session channels over a second time interval that occurs subsequent to the first time interval; and responsive to the selecting, instructing the first electronic device via the first signaling channel and the second electronic device via the second signaling channel to establish the hybrid media session using the second session channel such that media data is communicated on the second session channel and not the first session channel.

3. The method of claim 2, further comprising:
responsive to the monitoring, selecting the first session channel, from the plurality of session channels, that has a highest estimated quality of service of all the plurality of session channels over a third time interval that occurs subsequent to the second time interval; and responsive to the selecting, instructing the first electronic device via the first signaling channel and the second electronic device via the second signaling channel to communicate media data on the first session channel and not the second session channel.

4. The method of claim 3, further comprising:
responsive to the monitoring, selecting a third session channel, from the plurality of session channels, that has a highest estimated quality of service of all the plurality of session channels over a fourth time interval that occurs subsequent to the third time interval; and responsive to the selecting, instructing the first electronic device via the first signaling channel and the second electronic device via the second signaling channel to establish the hybrid media session using the third session channel such that media data is communicated on third session channel and not the first session channel.

5. The method of claim 2, further comprising:
terminating the hybrid media session on the first session channel.

6. The method of claim 2, wherein the plurality of session channels includes a second peer-to-peer session channel, and the second session channel is the second peer-to-peer session channel.

7. The method of claim 2, wherein estimating the quality of service for each of the plurality of session channels available to couple the first electronic device on the first network with the second electronic device on the second network, further comprises:

determining one or more quality of service factors associated with each of the plurality of session channels;

scoring each of the quality of service factors to generate a set of factor scores for each of the plurality of session channels; and generating a quality of service score for each set of factor scores, each quality of service score corresponding to a different session channel of plurality of session channels.

8. The method of claim 1, further comprising:
providing an updated codec to the second electronic device.

9. A hybrid communications system, comprising:
a processor configured to execute modules; and
a memory storing the modules, the modules comprising:
a quality of service module configured to:
estimate a quality of service for each of a plurality of session channels available to couple a first electronic device on a first network with a second electronic device on a second network, the plurality of session channels including a peer- to-peer session channel and a server-controlled session channel, select a first session channel, from the plurality of session channels, that has a highest estimated quality of service of all the plurality of session channels over a first time interval, wherein the first session channel is the peer-to- peer channel; and a control server configured to instruct the first electronic device via a first signaling channel and a second electronic device via a second signaling channel to establish a hybrid media session using the first session channel such that media data is communicated on the first session channel;

a discovery module configured to:
instruct the first electronic device via the first signaling channel to operate at a reduced capability during the hybrid media session such that a second set of services, and not a first set of services, are available to the first electronic device;

identify at least one connection parameter associated with the second electronic device for update, the at least one connection parameter being access information for a firewall existing between the first electronic device and the second electronic device, the firewall being configured to block peer-to-peer media sessions; and configure the firewall to allow the peer-to-peer session channel between the first electronic device and the second electronic device.

10. The hybrid communications system of claim 9, wherein the quality of service module is further configured to:

monitor, during the hybrid media session, the estimated quality of service for the plurality of session channels, and responsive to the monitoring, select a second session channel, from the plurality of session channels, that has a highest estimated quality of service of all the plurality of session channels over a second time interval that occurs subsequent to the first time interval; and wherein the control server is further configured to, responsive to the selecting, instruct the first electronic device via the first signaling channel and the second electronic device via the second signaling channel to establish the hybrid media session using the second session channel such that media data is communicated on the second session channel and not the first session channel.

11. The hybrid communications system of claim 10, wherein, the quality of service module is further configured to:

responsive to the monitoring, select the first session channel, from the plurality of session channels, that has a highest estimated quality of service of all the plurality of session channels over a third time interval that occurs subsequent to the second time interval; and the control server is further configured to:

responsive to the selecting, instruct the first electronic device via the first signaling channel and the second electronic device via the second signaling channel to communicate media data on the first session channel and not the second session channel.

12. The hybrid communications system of claim 11, wherein, the quality of service module is further configured to:

responsive to the monitoring, select a third session channel, from the plurality of session channels, that has a highest estimated quality of service of all the plurality of session channels over a fourth time interval that occurs subsequent to the third time interval; and the control server is further configured to:

responsive to the selecting, instruct the first electronic device via the first signaling channel and the second electronic device via the second signaling channel to establish the hybrid media session using the third session channel such that media data is communicated on third session channel and not the first session channel.

13. The hybrid communications system of claim 11, wherein the control server is further configured to terminate the hybrid media session on the first session channel.

14. The hybrid communications system of claim 11, wherein the plurality of session channels includes a second peer-to-peer session channel, and the second session channel is the second peer-to-peer session channel.

15. The hybrid communications system of claim 11, wherein the quality of service module is further configured to:

determine one or more quality of service factors associated with each of the plurality of session channels;

score each of the quality of service factors to generate a set of factor scores for each of the plurality of session channels; and generate a quality of service score for each set of factor scores, each quality of service score corresponding to a different session channel of plurality of session channels.

16. A hybrid communications system, comprising:
a processor configured to execute modules; and
a memory storing the modules, the modules comprising:
a quality of service module configured to:

estimate a quality of service for each of a plurality of session channels available to couple a first electronic device on a first network with a second electronic device on a second network, the plurality of session channels including a peer-to-peer session channel and a server-controlled session channel;

determine that a peer-to-peer session channel session was established previously between the first electronic device and the second electronic device;

responsive to the determination, positively weight the quality of service for the peer-to-peer session channel relative to the server-controlled session channel;

select a first session channel, from the plurality of session channels, that has a highest estimated quality of service of all the plurality of session channels over a first time interval, wherein the first session channel is the peer-to- peer channel; and a control server configured to instruct the first electronic device via a first signaling channel and a second electronic device via a second signaling channel to establish a hybrid media session using the first session channel such that media data is communicated on the first session channel; and a discovery module configured to:

instruct the first electronic device via the first signaling channel to operate at a reduced capability during the hybrid media session such that a second set of services, and not a first set of services, are available to the first electronic device;

identify at least one connection parameter associated with the second electronic device for update, the at least one connection parameter being access information for a firewall existing between the first electronic device and the second electronic device, the firewall being configured to block peer-to-peer media sessions; and configure the firewall to allow the peer-to-peer session channel between the first electronic device and the second electronic device.

17. The hybrid communications system of claim 16, wherein the quality of service module is further configured to:

monitor, during the hybrid media session, the estimated quality of service for the plurality of session channels, and responsive to the monitoring, select a second session channel, from the plurality of session channels, that has a highest estimated quality of service of all the plurality of session channels over a second time interval that occurs subsequent to the first time interval; and wherein the control server is further configured to, responsive to the selecting, instruct the first electronic device via the first signaling channel and the second electronic device via the second signaling channel to establish the hybrid media session using the second session channel such that media data is communicated on the second session channel and not the first session channel.

* * * * *

UNITED STATES PATENT AND TRADEMARK OFFICE
CERTIFICATE OF CORRECTION

PATENT NO. : 9,838,441 B2
APPLICATION NO. : 15/090181
DATED : December 5, 2017
INVENTOR(S) : Patrice Khawam et al.

Page 1 of 1

It is certified that error appears in the above-identified patent and that said Letters Patent is hereby corrected as shown below:

In the Claims

Claim 4, Column 19, Line 66: "on third session channel and not the first session" to read as -- on the third session channel and not the first session --

Claim 7, Column 20, Line 21: "of plurality of session channels" to read as -- of the plurality of session channels --

Claim 12, Column 21, Line 45: "on third session channel and not the first session" to read as -- on the third session channel and not the first session --

Claim 15, Column 21, Line 64: "of plurality of session channels" to read as -- of the plurality of session channels --

Signed and Sealed this
Twenty-fourth Day of July, 2018

Andrei Iancu
*Director of the United States Patent and Trademark Office*